June 6, 1933.  C. H. WILLIS  1,913,146
ELECTRICAL REGULATING SYSTEM
Filed Feb. 14, 1931
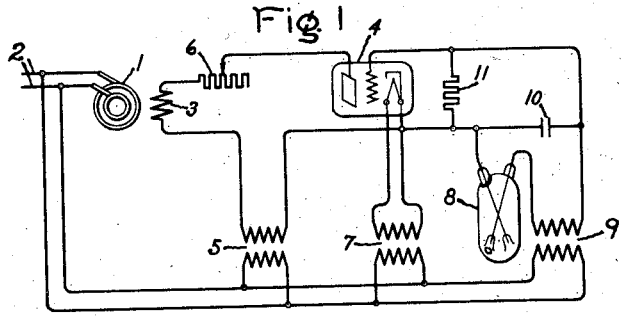
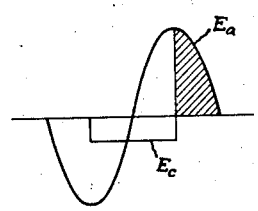 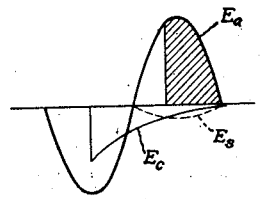
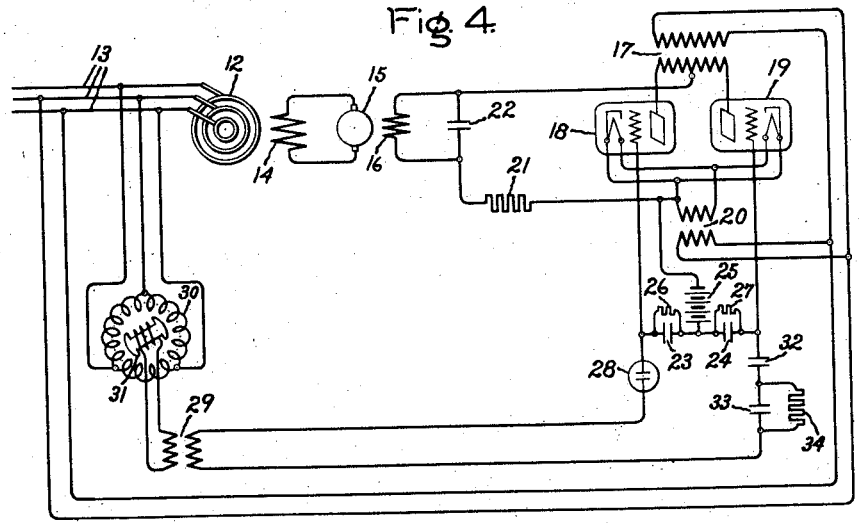
Inventor:
Clodius H. Willis,
by *Charles E. Tullar*
His Attorney.

Patented June 6, 1933

1,913,146

UNITED STATES PATENT OFFICE

CLODIUS H. WILLIS, OF SCHENECTADY, NEW YORK, ASSIGNOR TO GENERAL ELECTRIC COMPANY, A CORPORATION OF NEW YORK

ELECTRICAL REGULATING SYSTEM

Application filed February 14, 1931. Serial No. 515,824.

My invention relates to electrical regulating systems and more particularly to regulating systems employing electric discharge devices or electric valves for controlling an electrical characteristic of a dynamo-electric machine.

The regulating unit of most regulating systems consists of a constant element, which determines the value of the electrical characteristic to be maintained, an element varying in accordance with the characteristic to be regulated and balanced against the constant element, and an arrangement operative in accordance with variations from the balanced condition for bringing the regulated characteristic back to the predetermined value. For example, in the elementary vibratory regulator of the Tirrill type, the modulus of elasticity of the spring is the constant element, and the pull of the solenoid which is dependent upon the characteristic regulated is the variable element. The resultant forces due to the solenoid and the spring act on a plunger which operates a contact by which a resistance is controlled to effect regulation.

In accordance with my invention I employ an electric discharge device, referred to hereinafter as a corona discharge tube, having a critical breakdown voltage, as the constant element in my regulating system, and employ the discharge through this tube after breakdown for controlling the discharge of other electric discharge devices or electric valves which are utilized to effect the regulation desired.

It is an object of my invention to provide a new and improved regulating system employing electric discharge devices.

Another object of my invention is to provide a new and improved regulating system that does not include the use of moving contacts and is both sensitive and reliable in its operation.

A further object of my invention is to provide a new and improved arrangement for controlling the conductivity of an electric valve.

My invention will be better understood from the following description taken in connection with the accompanying drawing and its scope will be pointed out in the appended claims.

In the accompanying drawing Fig. 1 is a diagrammatic representation of a simple embodiment of my invention for controlling a single phase alternating current generator, Figs. 2 and 3 are explanatory diagrams illustrating certain features of operation and control of the electric valves employed in the embodiments illustrated in Figs. 1 and 4, and Fig. 4 is a diagrammatic representation of an embodiment of my invention for controlling alternators equipped with the usual direct current exciter.

In Fig. 1 of the drawing I have illustrated a simple, elementary embodiment of my invention for more clearly disclosing the novel features thereof. A dynamo-electric machine 1, shown as a single phase alternator, is connected to supply power to a power circuit 2. The alternator is provided with a field winding 3 which is supplied with exciting current from the power circuit 2 through an electric valve 4. The valve 4 is provided with an anode, a cathode and a control electrode or grid, and is preferably of the gaseous or vapor electric type because of the greater current carrying capacity of this type as now developed as compared to electric discharge devices of the pure electron discharge type. Transformer 5 is connected to be energized from circuit 2 and is provided for energizing the field winding 3 through the valve 4. A resistor 6 is connected in series with the field winding 3 for purposes of adjustment. The cathode of valve 4 is connected to a heating source through any suitable means and as illustrated through the transformer 7 which is connected to be energized from the circuit 2. In order to effect control of the valve 4 and thereby obtain control of the excitation of the alternator 1, I employ as the constant element in my regulating system, a corona or glow discharge tube 8 in circuit with the grid control circuit of valve 4. A transformer 9 is connected to be energized from the circuit 2 and its secondary winding is connected through the corona tube 8 across a capacitor 10 which is connected to control the grid bias of valve 4. The capacitor 10 is also provided with a resistance leak 11 for the purpose hereinafter described.

The corona tube 8 may be of any suitable construction comprising two spaced electrodes in a suitable envelope containing inert gas at a pressure such that the tube has a substantially constant critical breakdown voltage. Preferably, however, I employ the structure illustrated in Fig. 1 in which the wire electrodes are arranged in spaced relation with the longitudinal axes thereof in angular, non-intersecting relation. In order to avoid a point discharge the more general arrangement should be such that there is a single common normal to the longitudinal axes between points intermeditae the terminals of the respective electrodes. Due to the fact that the corona tube contains a definite quantity of gas constrained to a fixed volume the mean free path of an ion and therefore the breakdown voltage are practically independent of temperature. Since ionization builds up very quickly at a voltage above the critical value, the breakdown voltage is also independent of frequency within the commercial range. With the electrodes surrounded by an inert gas such as argon there is negligible disintegration of the electrodes during discharge.

In the elementary embodiment illustrated in Fig. 1 the control of the valve 4 is obtained by so controlling the grid potential that when the alternator voltage is below the normal or predetermined value the valve passes current during the full period of the positive half cycles and when the voltage is above the critical breakdown voltage of the corona tube the grid potential is so modified that the valve passes current during a portion of the period of the positive half waves. This action will vary the excitation by definite steps and will give fluctuations in the excitation current resulting in a mean average current necessary to maintain the desired alternator voltage, similarly to the result produced by opening and closing the contacts of a vibratory regulator of the Tirrill type.

The method of controlling the grid potential may be better understood from a consideration of Fig. 2. In Fig. 2 I have indicated for purposes of illustration the anode potential of the valve 4 by the curve $Ea$. The valve 4 is assumed to be a gaseous tube of the discontinuous control type having a negative grid characteristic in which the starting of current through the valve is obtained with a positive grid potential and in which the current through the valve may be interrupted after it is once started only by reducing the anode potential below its critical value. When the alternator voltage is below the critical breakdown voltage of the corona tube 8 the grid is arranged to have such a potential that the valve 4 passes current during the full period of each positive half-wave. Now, if the anode voltage during a half wave following one of the particular positive half waves just mentioned exceeds the critical valve of the corona tube, the capacitor 10 will be charged in the manner illustrated by the curve $Ec$. As a result the grid is given a negative potential and on the next positive half wave the tube will not start at the beginning of the cycle. However, on the peak of the positive half wave the grid bias will be reversed by virtue of the fact that the capacitor 10 is charged in the opposite direction. The valve 4 will now conduct current during the latter half of the positive half wave indicated by the shaded area. In this way the average value of field current will be reduced one half the full half wave value during the time the alternator voltage is above the critical breakdown value of the corona tube.

The arrangement just described gives a very limited range of control but this may be modified to obtain a more flexible and great range of control by shifting the phase of the grid potential with respect to the anode potential. For example, if the voltage from the transformer 9 is caused to lag, the anode potential the average current may be reduced to less than fifty per cent of its full wave value because the grid bias will be reversed after the peak of the anode potential wave. When the corona tube is supplied from a voltage 60 degrees behind the anode voltage as in a three phase machine the corona tube will reduce the average current to several per cent of the full wave value.

A further modification in the control is obtained by the use of the resistance leak 11 connected across the capacitor 10. If the resistance leak is so chosen that the time constant of the capacitor and leak is substantially equal to the period of one half wave the grid capacitor voltage may be reduced by leakage to a value where the valve will start conducting at some point previous to or later than the 90 degree point in the succeeding half wave. The time it will take to reduce the grid potential to the starting value will depend on the initial charge on the capacitor and this is determined by the excess of voltage above the critical value of the corona tube. Therefore, the time of starting of the valve 4 in any half wave will be delayed by an amount which is determined by the excess of the regulated voltage above the breakdown voltage of the corona tube. A small rise in alternator voltage above the critical value will serve to reduce the current through the tube to a value of the order of several per cent of its full wave value.

The feature of control just described may be readily understood from an examination of Fig. 3. The curve $Ea$ represents the anode voltage of the valve and the curve $Ec$ represents the capacitor voltage after a negative half wave when the peak value exceeds the critical breakdown voltage of the corona tube. The charge of the capacitor starts to leak off due to the resistance 11 and the capacitor voltage decays along a curve similar to $Ec$. As soon as the grid potential becomes more positive than the critical starting voltage of the valve 4, indicated by the dotted line $Es$, the current starts through the tube in an amount indicated by the shaded area.

In Fig. 4 I have shown an embodiment of my invention for controlling a polyphase generator provided with the usual exciter. The polyphase generator is illustrated as a three phase alternator 12 connected to energize a power circuit 13. The alternator is provided with a field winding 14 which is connected to be energized from an exciter 15. The exciter 15 is provided with a field winding 16 which is connected to be energized from the power circuit 13 through a transformer 17 and valves 18 and 19, each provided with an anode, a cathode, and a grid and preferably of the same type as valve 4 in Fig. 1. These valves are connected in the well known manner for full wave rectification. Heating current for the cathodes of the valves may be obtained from a convenient source of current and as illustrated is obtained from the power circuit through a transformer 20. A resistance 21 is connected in series with the field winding 16 for purposes of adjustment and a capacitor 22 is connected in parallel therewith to by-pass any alternating current ripples in the rectified current. The control of the grids is obtained by varying the charge and discharge of capacitors 23 and 24 which are connected in series between the grids of the respective valves with a common point therebetween connected through a positive biasing means, shown as a battery 25, to the common cathode circuit of the two valves. Resistances 26 and 27 are connected in a parallel circuit with the capacitors 23 and 24 respectively so that the grid capacitor voltage may be reduced by leakage to a value necessary to start the valves at a particular point in the cycle depending upon the initial charge on the capacitor. The capacitors 23 and 24 are connected to be charged in series through a corona tube 28. For purposes of greater flexibility in control the voltage applied to the corona tube 28 is obtained from a grid transformer 29 which is connected to be energized from the power circuit 13 through any of the phase shifting arrangements well known in the art, such for example as a rotary phase shifting transformer illustrated as comprising a polyphase stationary primary winding 30 and a rotatable single phase secondary winding 31.

It may be difficult to make a corona tube so symmetrical that it will break down on the same voltage on both the positive and negative half waves of applied voltage. This difficulty may be avoided by connecting a capacitor 32 in series with the corona tube 28 in the charging circuit for the capacitors 23 and 24 so as to suppress any unidirectional components of current.

In cases where it is necessary or desirable to use valves to energize the field winding of an exciter instead of directly energizing the main field winding of the machine to be controlled, particularly in a regulating system for an alternator as illustrated in Fig. 4, the time lag of the exciter and alternator field windings causes oscillations of the generator voltage about the period of the time constant of the field winding circuits. For the purpose of suppressing these oscillations I introduce into the corona tube circuit a transient of about the same period as the oscillations. This transient is introduced by a capacitor 33 with a resistance 34 connected in parallel thereto and both connected in series with the corona tube 28. The constants are so chosen that the time constant of the corona tube circuit is substantially equal to the time constant of the slowest field winding.

The operation of the embodiment of my invention illustrated in Fig. 4 is substantially in accordance with the theory of operation outlined in the description of the operation of the embodiment illustrated in Fig. 1. When the voltage of the circuit 13 is below the critical breakdown voltage of the corona tube 28 the grids of the valves 18 and 19 are at a potential under the positive bias of battery 25 such that the respective valves pass current during the full period of the positive or negative half waves of anode voltage. For purposes of explanation let it be assumed that valve 18 controls the current on the positive half wave and that valve 19 controls the current on the negative half wave. If, following a particular positive half wave, when valve 18 is fully conducting the peak value of the negative half wave exceeds the critical breakdown voltage of the corona tube 28 the grid potential of the valve 18 will be made more negative since the capacitors 23 and 24 will be charged so as to make the grid connection end of capacitor 24 positive and the grid connection end of capacitor 23 negative. When the anode potential of valve 18 becomes positive again the grid is no longer positive at the beginning of the cycle and does not become positive until some point later in the cycle depending upon the curve of decay of the capacitor voltage. In a similar manner if the voltage of circuit 13 exceeds the breakdown voltage of corona tube 28 on the following positive half wave the capacitors 23 and 24 are charged in the opposite direction so as to make the grid of valve 19 negative at the beginning of the cycle. This action only permits current to start through the valve at some point later in the cycle depending upon the curve of decay of the capacitor voltage. In this way the valves pass current only during a portion of successive cycles so that the average valve current is reduced and thereby the average excitation current of the alternator is reduced. This action tends to maintain a constant voltage at the alternator terminals by adjusting the mean average current in the field winding of the alternator to that value necessary for the particular operating condition.

While I have shown and described particular embodiments of my invention, it will be obvious to those skilled in the art that changes and modifications may be made without departing from my invention and I, therefore, aim in the appended claims to cover all such changes and modifications as fall within the spirit and scope of my invention.

What I claim as new and desire to secure by Letters Patent of the United States, is:—

1. In combination, an electric valve provided with a control electrode, means for controlling said valve comprising a capacitor connected to said control electrode, a source of control potential for energizing said capacitor, and a corona discharge device connected in series relation with said capacitor and said source for controlling the conductivity of said valve.

2. In combination, an electric valve provided with a control electrode, means for controlling said valve comprising a capacitor connected to said control electrode, a source of control potential for energizing said capacitor, a corona discharge device connected in series relation with said capacitor and said source for controlling the charge thereof, and means for controlling the discharge of said capacitor for controlling the conductivity of said valve.

3. In combination, an electric valve provided with a control electrode, means for controlling said valve comprising a capacitor connected to said control electrode, a source of control potential for energizing said capacitor, a corona discharge device connected in series relation with said capacitor and source of control potential for controlling the charge thereof, and a resistance connected in a parallel circuit to said capacitor, said capacitor and resistor being so chosen in value as to make the time constant thereof equal to the period of one half wave of said valve.

4. In combination, an alternating current circuit, an electric valve connected to said circuit and provided with an anode, a cathode and a control grid, means for controlling said valve comprising a capacitor connected between said cathode and anode, means comprising a corona discharge device connecting said capacitor to be energized from said alternating circuit, and means for shifting the phase relation between the potential of said anode and the potential applied to said capacitor.

5. In a regulating system, an electric circuit, an electric valve having a control electrode for controlling the average output of said valve for controlling an electrical condition of said circuit, and means comprising a discharge device connected to said circuit and operative above a critical peak value of the voltage of said circuit for changing the potential of said control electrode to decrease the average output of said valve.

6. In a regulating system, an electric circuit, an electric valve provided with a control electrode for controlling an electrical condition of said circuit, and means for controlling the conductivity of said valve including a corona discharge tube having a critical breakdown voltage and operating as the constant element of said regulating system, means for impressing variations in an electrical condition of said circuit upon said corona tube and operating as the variable element of said regulating system, and means operative in response to the current passing through said corona tube above its breakdown voltage for controlling the potential of said control electrode.

7. In a regulating system, an alternating current circuit, a direct current circuit for controlling an electrical conditon of said alternating current circuit, an electric valve having a control electrode and connected to said direct current circuit for controlling the energization thereof, means for impressing a voltage upon the control electrode of said valve, and means comprising an electric discharge device having a critical breadown voltage and connected to be responsive to an electrical condition of said alternating current circuit for controlling the potential of said first-mentioned means.

8. In a regulating system, a dynamo-electric machine having an armature circuit and an excitation circuit, an electric valve provided with a control electrode for controlling the energization of said excitation circuit, a capacitor for impressing a voltage upon the control electrode of said valve, and means comprising a corona tube connected to the armature circuit to be operative above a critical value of voltage for charging said capacitor.

9. In a regulating system, a dynamo-electric machine having an armature circuit and an excitation circuit, an electric valve provided with a control electrode for controlling the energization of said excitation circuit, a capacitor for impressing a voltage upon the control electrode of said valve, means comprising a corona tube connected to the armature circuit to be operative above a critical value of voltage for charging said capacitor, and means for controlling the rate of discharge of said condenser.

10. In a regulating system, a dynamo-electric machine having an armature circuit and an excitation circuit, an electric valve provided with an anode, a cathode, and a grid for controlling the energization of said excitation circuit, means for impressing a potential upon said anode, a capacitor for impressing a voltage upon the grid of said valve, a corona tube connected to the armature circuit to be operative above a critical value of voltage for charging said capacitor, and means for varying the phase relation between the potential impressed upon said anode and said corona tube.

11. In a regulating system, a dynamo-electric machine having an armature circuit and an excitation circuit, an electric valve provided with an anode, a cathode, and a grid, for controlling the energization of said excitation circuit, means for impressing a potential upon said anode, a capacitor for impressing a voltage upon the grid of said valve, a corona tube connected to the armature circuit to be operative above a critical value of voltage for charging said capacitor, means for varying the phase relation between the potential impressed upon said anode and said corona tube, and means for controlling the rate of discharge of said capacitor.

12. In combination, an alternating current machine, a field winding therefor, an exciter connected to said field winding, a field winding for said exciter, an electric valve for controlling the energization of said exciter field winding, means for controlling the conductivity of said valve, means comprising a corona tube for controlling said first-mentioned means, and means for introducing a current transient in the corona tube circuit, said last-mentioned means being so proportioned as to make the time constant of the corona tube circuit substantially equal to the time constant of one of said field windings whereby oscillations in the voltage of said alternating current machine may be suppressed.

13. In a regulating system, an alternating current dynamo-electric machine having an armature circuit and an excitation circuit, an exciter connected to energize said excitation circuit, a field winding for said exciter, a full wave rectifier comprising a plurality of electric valves each provided with an anode and a grid and connected to energize said field winding from said armature circuit, capacitors connected to control the potential of said grids, a circuit connected to be energized from said armature circuit for charging said capacitors, a corona tube in series relation with said circuit, and a parallel connected resistor and capacitor in series relation with said corona tube, said last-mentioned capacitor and resistor being so chosen in value as to make the time constant of said circuit substantially equal to the time constant of said excitation circuit.

14. In a regulating system, a polyphase alternating current generator having an armature circuit and an excitation circuit, an exciter connected to energize said excitation circuit, a field winding for said exciter, a full wave rectifier comprising two electric valves each provided with an anode, a cathode and a grid and connected to energize said field winding from said armature circuit, two capacitors connected in series relation between the grids of said valves, a battery connected to the intermediate connection point of said capacitors and to the common cathode circuit of said valves in such a manner as to impose a positive bias on said grids, a second capacitor connected in parallel relation to said field winding for suppressing alternating current ripples in said rectifier current, a circuit connected to said armature circuit for impressing a potential upon said anodes, a second circuit connected to said armature circuit for impressing a potential upon said series connected capacitors, means interposed in said second circuit for shifting the phase relation between the potential applied to said series connected capacitors and said anodes, a corona tube connected in series relation with said second circuit, a third capacitor and a resistor connected in parallel thereto in series relation with said corona tube, said last-mentioned capacitor and resistor being so chosen in value as to make the time constant of the associated circuit equal to the time constant of said excitation circuit, and a fourth capacitor connected in series relation with said corona tube for suppressing unidirectional current pulses therein whereby said corona tube may have a constant critical breakdown potential on both positive and negative waves of the voltage impressed thereupon.

In witness whereof, I have hereunto set my hand.

CLODIUS H. WILLIS.